C. P. FILSON.
FLASHLIGHT APPARATUS.
APPLICATION FILED NOV. 28, 1910.
995,447.
Patented June 20, 1911.
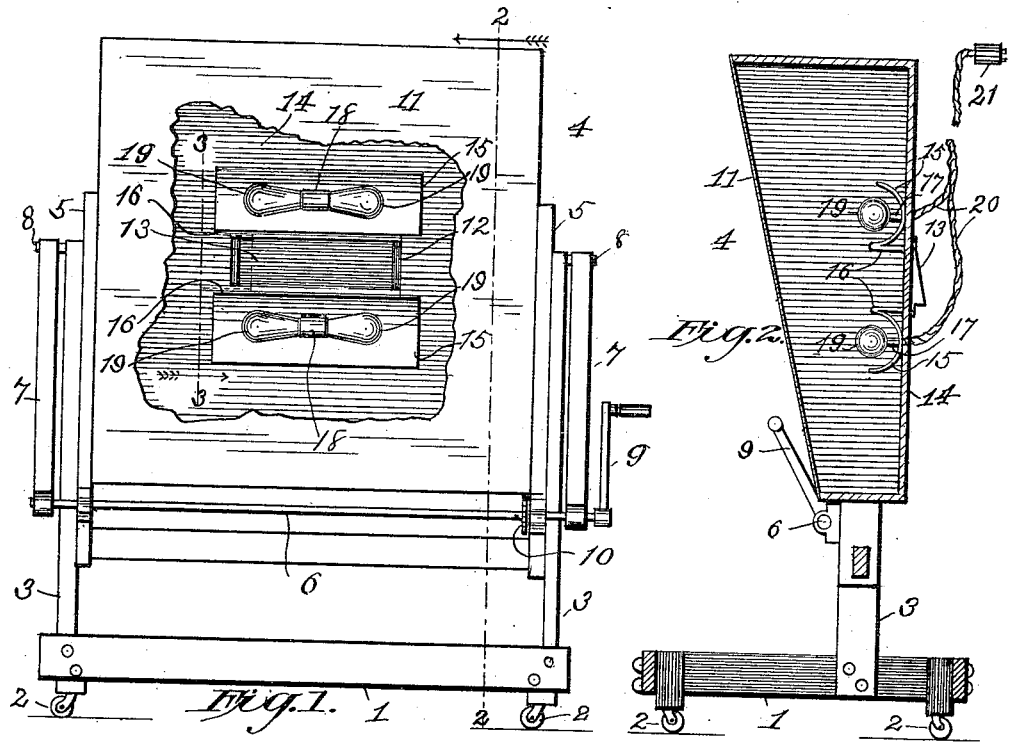
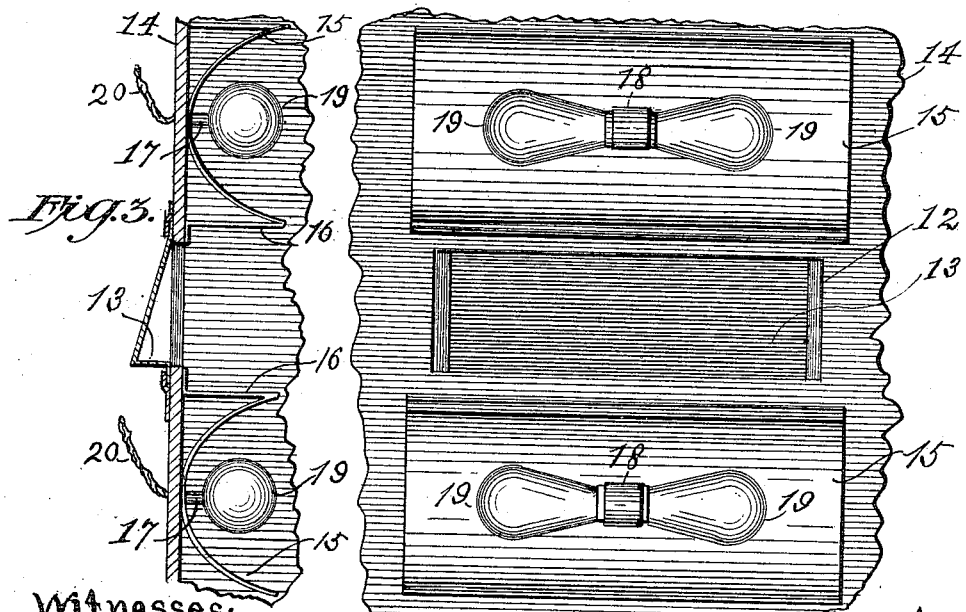
Witnesses:
R. B. Fernald
Jennie L. Fiske
Inventor:
Charles P. Filson
By David H. Fletcher
his Atty.

UNITED STATES PATENT OFFICE.

CHARLES PATTERSON FILSON, OF STEUBENVILLE, OHIO, ASSIGNOR TO JAMES H. SMITH & SONS COMPANY, OF CHICAGO, ILLINOIS, A CORPORATION OF ILLINOIS.

FLASH-LIGHT APPARATUS.

995,447.                 Specification of Letters Patent.     Patented June 20, 1911.

Application filed November 28, 1910. Serial No. 594,518.

*To all whom it may concern:*

Be it known that I, CHARLES P. FILSON, a citizen of the United States, residing at Steubenville, in the county of Jefferson and State of Ohio, have invented certain new and useful Improvements in Flash-Light Apparatus, of which the following is a description, reference being had to the accompanying drawings, forming a part of this specification, in which corresponding numerals of reference in the different figures indicate like parts.

My invention relates to flash-light apparatus for photographic purposes and more especially that employed for portrait work.

It is of unquestioned advantage to the photographer to be able to insure proper light conditions so as to permit him to prosecute his work at night and upon dark days. The ordinary flash-light possesses marked advantages in this respect but has heretofore been subject to the objection that, so far as the proper lighting of the subject is concerned, success is based upon guesswork and when obtained is a matter of mere luck. The operator usually employs an artificial light for the purpose of focusing the lens, but inasmuch as it is not softened by diffusion and is not in the same position as the flash so that the angles of incidence of the two must necessarily differ, it affords no criterion as to the light and shadow effect which the flash itself would give.

The object of my invention is to overcome this difficulty by providing suitable apparatus within the flash-light closure by so adjusting and manipulating the same that the rays of light therefrom will preserve substantially the same angles of incidence and fall upon the subject in substantially the same manner as those of the flash, so that the operator may not only obtain the proper focus but may be able to study the lights and shadows upon his subject with the utmost nicety of detail, and to decide upon the best effects before making an exposure.

To these ends my invention consists in the combination of elements hereinafter more particularly described and definitely set forth in the claims.

In the drawings, Figure 1, is a front elevation of a flash-light apparatus embodying the features of my invention, a portion being broken away to show the interior. Fig. 2, is a vertical sectional view thereof taken upon the line 2—2, Fig. 1, viewed in the direction of the arrow there shown, Fig. 3, is an enlarged sectional view in detail taken upon the line 3—3, Fig. 1, and Fig. 4, is a front elevation thereof.

Referring to the drawings, 1 represents the base portion of a frame mounted upon casters 2, and provided with rigid uprights 3, upon which is mounted a casing 4, having vertical end cleats 5, 5, slidingly connected by means of suitable guides, to the uprights 3. A shaft 6 is journaled in bearings in the lower ends of the cleats 5 and is connected by means of suitable webs 7, 7, to brackets or pins 8 upon the upper ends of the uprights 3. A crank 9 enables the shaft to be turned, while a ratchet mechanism 10, serves to prevent its reversal. The turning of the crank causes the webs 7 to be wound upon or unwound from the shaft, thereby raising or lowering the casing 4 to any desired height. Said casing forms a flash-light closure, the top, bottom, sides and back being formed from wood or other suitable material, while the front 11 may be made from any translucent fabric or medium adapted to transmit light while preventing the passage of smoke, such, for example, as muslin or other cotton or linen fabric suitably treated with a fire-proofing material. The back of the closure is provided with an elongated opening 12, outside of which is located a flash-lamp 13 adapted to slide in place in suitable guides in conjunction with a cover-plate, not shown, for covering the opening when the lamp or flash-pan is removed for the purpose of charging it with the usual flash-light powder.

So much of the construction as I have described is well known to the art and I make no claim thereto. Inasmuch, however, as it is especially adapted for studio work and can readily be moved from one location to another in a room and quickly adjusted as to height, angle and position with respect to the illumination of the subject, I prefer to employ it in combination with my improvement.

Rigidly attached to the back 14, preferably above and below the flash-light opening, are reflectors 15, preferably bent in the manner described to reflect light and provided with horizontal portions 16, which serve as shields against which the flame of the flashlight may contact thereby protecting the lamps from the direct action of the flashlight flame. Openings are formed in the reflectors through which electric light brackets 17, are extended which brackets are provided with the usual sockets 18, to receive electric light bulbs 19. I prefer to employ two of said bulbs with each reflector each of about forty candle power. The terminals 20 of said sockets are connected with the usual plug 21 for connection with a source of electric energy. The lamps are kept burning during the operations of focusing the lens and exposing the plate. The intensity of the light from the lamps is sufficient to enable the lights and shadows upon the face of the subject to be seen in all their varying gradations, so that each detail may be carefully studied and the desired effects obtained. Moreover, the light being diffused through the translucent front, 11, its harshness is entirely eliminated and inasmuch as the angles of incidence of the rays are substantially the same, it follows that it must produce the same effect upon the subject that would be produced from the flash. When, therefore, a given effect is produced by the focusing light, the operator is assured that the same effect will be produced by the flash and he makes the exposure accordingly with the desired result.

I do not wish to be limited to any specific form of apparatus, as it is obvious that the same may be varied without departing from the spirit of the invention which comprises a focusing light so located within a flashlight closure, as to be diffused through the fabric thereof with substantially the same angles of incidence, so as to produce in all except intensity, the same lighting effect upon the subject as that produced by the flash itself.

While I prefer to use incandescent electric lights where obtainable for focusing purposes, it is apparent that the shields would permit other kinds of artificial light to be employed when necessary.

Having thus described my invention, I claim:

1. In a flash-light apparatus, the combination of a flash-light closure, a focusing lamp located therein, a flash-lamp located in juxtaposition to said focusing lamp and means for shielding the focusing lamp from the explosive action of the flash-powder in the flash-lamp.

2. In a flash-light apparatus, the combination of a flash-light closure, an incandescent electric focusing lamp located therein, means for connecting the same with a source of electric energy from without, a flash-lamp located within said closure, adjacent to said focusing lamp, and means for shielding said focusing lamp from the flash produced by the other.

3. In a flash-light apparatus of the class described, the combination of a flash-light closure, having at least one of its walls formed from a light transmitting material, a flash-lamp located within said closure, electric incandescent focusing lamps located upon opposite sides of said flash-lamp in close proximity thereto and shields interposed between said flash-lamp and said focusing-lamp to protect the latter from the explosive action of the flash.

4. In a flash-light apparatus of the class described, the combination of a flash-light closure having its front wall formed from a light transmitting material, a flash-lamp located upon the rear wall thereof, incandescent electric lights located upon said wall upon opposite sides of said flash-lamp, reflectors behind said focusing lamps and shields between said flash lamp and said focusing lamps.

In testimony whereof, I have signed this specification in the presence of two subscribing witnesses, this 15th day of November, 1910.

CHARLES PATTERSON FILSON.

Witnesses:
DAVID H. FLETCHER,
JENNIE L. FISKE.

---

Copies of this patent may be obtained for five cents each, by addressing the "Commissioner of Patents, Washington, D. C."